United States Patent
Neidlinger

(10) Patent No.: US 6,744,220 B2
(45) Date of Patent: Jun. 1, 2004

(54) FREE-RUNNING CIRCUIT ARRANGEMENT

(75) Inventor: Thomas Neidlinger, Blaustein (DE)

(73) Assignee: Patent-Treuhand-Gesellschaft für Elektrische Glühlampen mbH, Munich (DE)

(*) Notice: Subject to any disclaimer, the term of this patent is extended or adjusted under 35 U.S.C. 154(b) by 160 days.

(21) Appl. No.: 10/208,754

(22) Filed: Aug. 1, 2002

(65) Prior Publication Data

US 2003/0025483 A1 Feb. 6, 2003

(30) Foreign Application Priority Data

Aug. 1, 2001 (DE) .......................... 101 37 305

(51) Int. Cl.$^7$ ............................................. H05B 37/00
(52) U.S. Cl. ................... 315/244; 315/238; 315/209 R; 315/291; 315/DIG. 5; 315/DIG. 7
(58) Field of Search ............................ 315/209 R, 205, 315/207, 225, 219, 244, 209 CD, 232, 238, 283, 291, DIG. 5, DIG. 7; 363/82, 80, 89, 97, 98

(56) References Cited

U.S. PATENT DOCUMENTS

| | | | | |
|---|---|---|---|---|
| 5,925,984 A | * | 7/1999 | Fischer et al. | 315/219 |
| 5,925,986 A | * | 7/1999 | Moisin | 315/247 |
| 5,962,987 A | * | 10/1999 | Statnic | 315/248 |
| 6,194,840 B1 | * | 2/2001 | Chang | 315/209 R |

* cited by examiner

Primary Examiner—Haissa Philogene

(57) ABSTRACT

A free-running circuit arrangement for operating a load, has at least one switching element, a freewheeling diode connected in an anti-parallel fashion relative to the main current direction of the at least one switching element, a load circuit and a control resonant circuit which comprises at least one control inductor and at least one self-capacitance of the at least one switching element. The at least one switching element has a control electrode, a working electrode and a reference electrode, a capacitance acting between the control and working electrodes that is coupled to the control resonant circuit such that energy is fed into the control resonant circuit by the charging and discharging current of this capacitance, the circuit arrangement having no components for feeding energy into the control resonant circuit by electromagnetic coupling.

17 Claims, 7 Drawing Sheets

FREE-RUNNING CIRCUIT ARRANGEMENT

TECHNICAL FIELD

The present invention relates to a free-running circuit arrangement for operating a load, having at least one switching element, a freewheeling diode that is connected in an anti-parallel fashion relative to the main current direction of the at least one switching element, a load circuit and a control resonant circuit which comprises at least one control inductor and at least one self-capacitance of the at least one switching element.

BACKGROUND ART

Such a generic free-running circuit arrangement is disclosed in DE 195 48 506. The principle in accordance with which this circuit operates can be gathered from FIG. 1 there: an inductor L2, in this case the lamp inductor, arranged in the load circuit is coupled to two auxiliary windings HW1 and HW2, the auxiliary winding HW1 being arranged in the control resonant circuit of a first switching element T1, and the auxiliary winding HW2 being arranged in the control resonant circuit of a second switching element T2. The oscillation of the circuit arrangement is maintained by electromagnetic feedback of energy from the load circuit into the respective control resonant circuit.

The disadvantage of this circuit arrangement consists in that wound items are very expensive and therefore substantially predetermine the costs of a circuit arrangement in addition to transistors.

It is therefore the object of the present invention to develop the generic free-running circuit arrangement in such a way that it is possible to maintain an oscillation without this requiring electromagnetic coupling of components of the load circuit to components of the control resonant circuit.

DISCLOSURE OF THE INVENTION

This object is achieved according to the invention by virtue of the fact that in the case of the generic free-running circuit arrangement the at least one switching element has a control electrode, a working electrode and a reference electrode, there acting between the control electrode and the working electrode a capacitance that is coupled to the control resonant circuit in such a way that energy is fed into the control resonant circuit by the charging and discharging current of this capacitance, the circuit arrangement having no components for feeding energy into the control resonant circuit by electromagnetic coupling.

The invention is based on the finding that the energy required to maintain the oscillation can be fed to the control resonant circuit via a capacitance. An expensive, frequently individually fabricated transformer is therefore no longer necessary.

A further advantage of the circuit arrangement according to the invention consists in that the circuit arrangement can be implemented with a smaller number of components.

In a particularly advantageous embodiment, one switching element has a Miller capacitance, the capacitance acting between the control electrode and the working electrode on the switching element comprising the Miller capacitance of the at least one switching element. Miller capacitances occur, for example, in field effect transistors. Depending on the design of the circuit, it can be possible that the Miller capacitance of the at least one switching element is alone sufficient to supply energy to the control resonant circuit for maintaining the oscillation. Should the Miller capacitance not suffice alone, an additional discrete capacitance can be connected in parallel with it.

It is therefore particularly advantageous to tune the control resonant circuit and the Miller capacitance of the at least one switching element to one another in such a way that the oscillation of the control resonant circuit is maintained solely by the charging and discharging currents of the Miller capacitance of the at least one switching element. This results in a further saving on components. However—as mentioned—it can also be provided to connect an additional capacitance in parallel with the Miller capacitance of the at least one switching element, the oscillation of the control resonant circuit being maintained by the charging and discharging currents of the Miller capacitance and of the additional capacitance of the at least one switching element.

The input capacitance present between control and reference electrodes of the at least one switching element can be used as the self-capacitance of the latter.

It is preferred for the circuit arrangement according to the invention to have a first and a second switching element, the first and the second switching elements being of complementary design and being coupled to a common control resonant circuit. The complementary design of the switching elements permits the use of a common control resonant circuit for both switching elements. It is preferred in this case for each switching element to have a control electrode, a working electrode and a reference electrode, the control electrodes being connected to one another with the formation of a first tie point, and the reference electrodes being connected to one another with the formation of a second tie point, the control inductor being coupled between the first and the second tie point.

However, it can also be provided that the circuit arrangement has a first and a second switching element that are of the same type, the first switching element being coupled to a first control resonant circuit, and the second switching element being coupled to a second control resonant circuit. Again, it is preferred for each switching element to have a control electrode, a working electrode and a reference electrode, the reference electrode of the first switching element being connected to the working electrode of the second switching element, and the respective control inductor being coupled between the respective control and reference electrodes of the respective switching element. This implementation has the advantage that two switching elements of identical type can be used, the electric performance thereby also being identical.

The first and the second switching element are preferably arranged in a half-bridge arrangement.

The load is preferably an illuminating means, preferably a low-pressure discharge lamp. However, it is also possible to use the circuit for other types of loads.

For the case in which the input capacitance of the at least one switching element is unfavorably dimensioned for implementing the circuit arrangement, it is preferred to connect a discrete supplementary capacitance in parallel with the input capacitance of the at least one switching element. This option yields further degrees of freedom for dimensioning the control resonant circuit.

The load circuit preferably has a series tuned circuit with an inductor, a capacitance connected in parallel with the load and at least one decoupling capacitance. The inductor is preferably dimensioned as a current-limiting and resonance inductor.

The at least one switching element is preferably a bipolar transistor or an MOS field effect transistor. For the case in which the circuit arrangement is implemented with the aid of at least one MOS field effect transistor, the body diode of the MOS field effect transistor can implement the freewheeling diode connected in an anti-parallel fashion. A discrete diode is to be provided as freewheeling diode in the case of an implementation of the at least one switching element as bipolar transistor.

Further advantageous developments of the invention are defined in the subclaims.

BRIEF DESCRIPTION OF THE DRAWINGS

An exemplary embodiment of the invention is described in more detail below with reference to the attached drawings, in which.

BEST MODE FOR CARRYING OUT THE INVENTION

Figure 1:
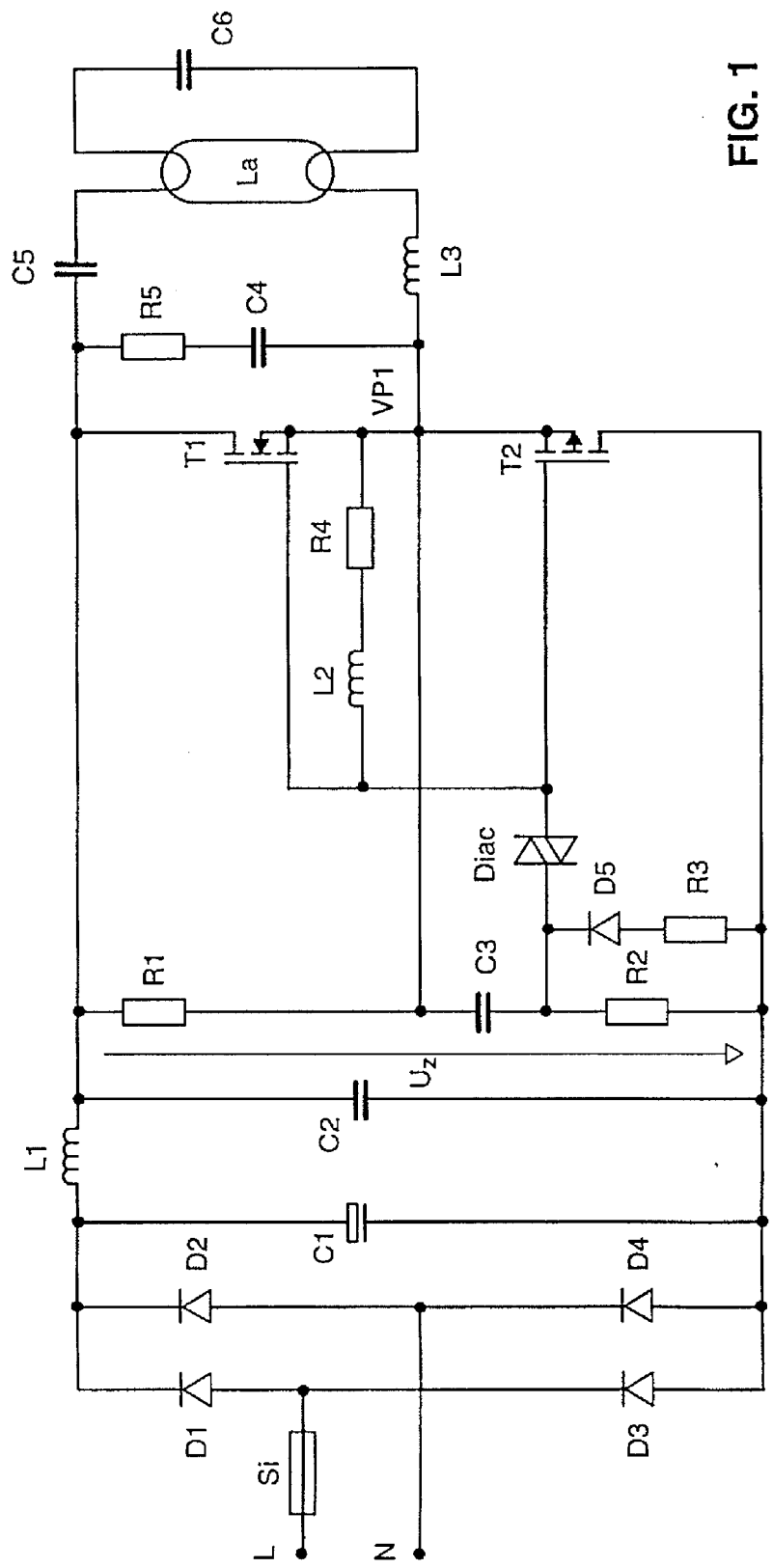
FIG. 1 shows a circuit diagram of a ballast for operating an illuminating means, having a free-running circuit arrangement according to the invention.

The ballast illustrated in FIG. 1 has a supply connection L, N that is connected via a fuse Si to a rectifier comprising four diodes D1, D2, D3, D4. The DC voltage smoothed by a capacitor C1 is made available via a filter having an inductor L1 and a capacitor C2 as what is termed intermediate circuit voltage $U_Z$ of the free-running circuit arrangement. Because of the voltage $U_Z$, the capacitor C3 is charged via the resistors R1 and R2. The circuit also comprises two MOS field effect transistors T1, T2, the drain terminal of the transistor T1 being connected to the positive terminal of the capacitor C2, the drain terminal of the transistor T2 being connected to the negative terminal of the capacitor C2. The source terminals of the two transistors T1, T2 are connected to one another with the formation of a tie point VP1, the tie point VP1 being connected to the positive terminal of the capacitor C3. The negative terminal of the capacitor C3 is connected to frame via a diode D5 and a resistor R3, the diode D5 and resistor R3 ensuring that the capacitor C3 is discharged during operation of the circuit arrangement, that is to say when the transistor T2 is turned on, so that the diac that is connected between the negative terminal of the capacitor C3 and the two gate terminals of the two transistors T1, T2 is not ignited in an interfering fashion during operation of the circuit arrangement. The series connection of an inductor L2 and a resistor R4 is arranged between the tie point VP1 and the interconnected gate terminals of the transistors T1, T2. Arranged on the one hand between the drain terminal of the transistor T1 and the tie point VP1 is the series connection of a resistor R5 and a capacitor C4, the series connection being connected in parallel with the series connection of a capacitor C5, the illuminating means La and the lamp inductor L3, a capacitor C6 being connected in parallel, for its part, to the illuminating means La.

Figure 2:
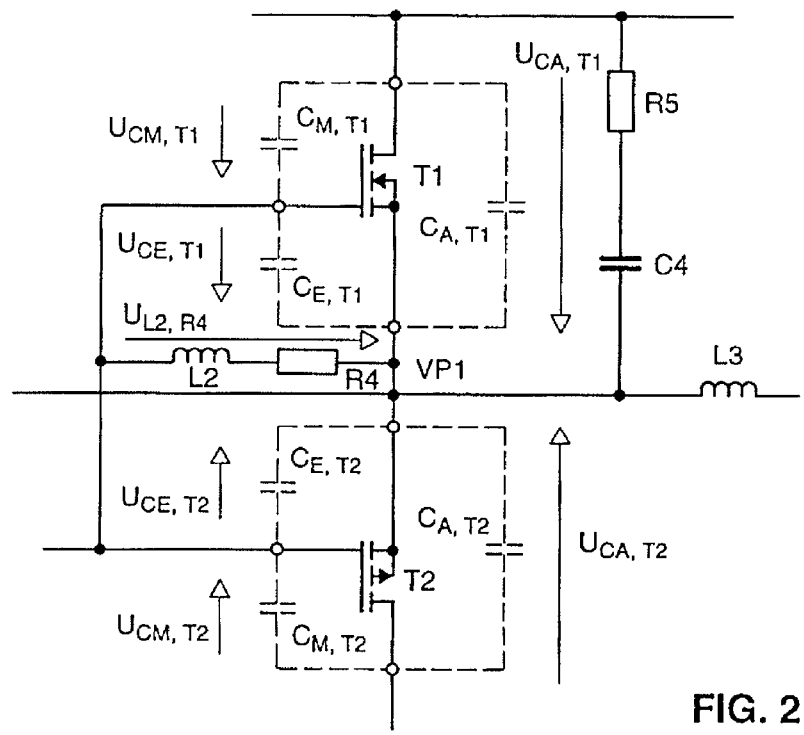
FIG. 2 shows a detail of the ballast in FIG. 1, transistor capacitances being illustrated by dashes.

FIG. 2 shows a detail of the ballast of FIG. 1, the transistor capacitances being illustrated by dashes. Arranged between the respective gate terminal and the respective drain terminal is the respective Miller capacitance $C_{M,T1}$ or $C_{M,T2}$, the respective input capacitance $C_{E,T1}$ or $C_{E,T2}$ is arranged between the respective gate terminal and the respective source terminal, while the respective output capacitance $C_{A,T1}$ or $C_{A,T2}$ is arranged between the respective drain terminal and the respective source terminal.

Figure 3:
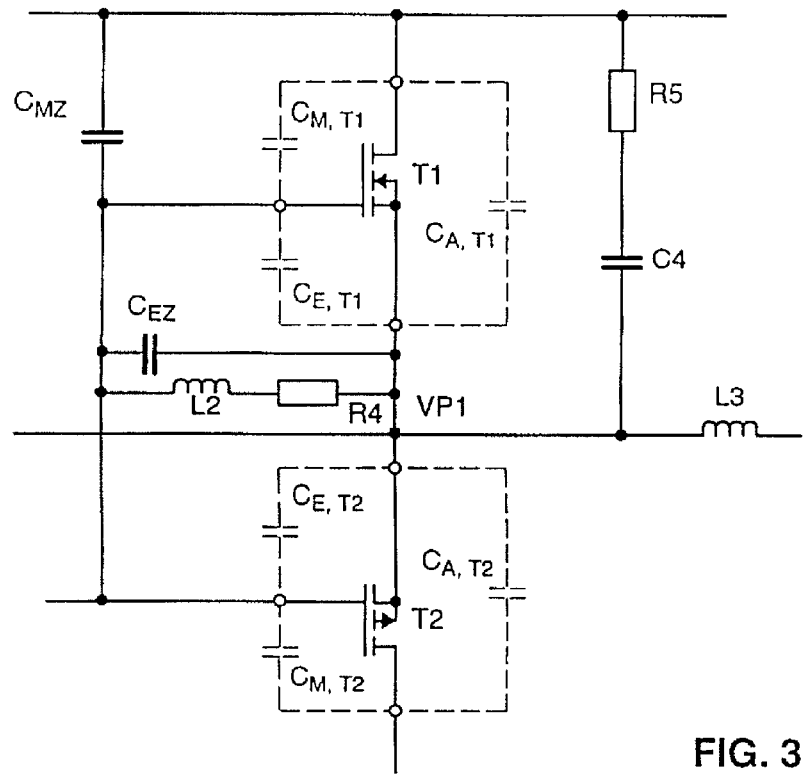
FIG. 3 shows the detail of FIG. 2 with additional capacitances for increasing the input capacitances and the Miller capacitances of the transistors.

For the case in which the transistor input capacitances $C_{E,T1}$, $C_{E,T2}$ and/or the Miller capacitances $C_{M,T1}$ or $C_{M,T2}$ are not sufficiently large to maintain oscillation, FIG. 3 shows a preferred option for their enlargement. Here, a capacitance $C_{MZ}$ is connected in parallel with the Miller capacitances $C_{M,T1}$, $C_{M,T2}$, while a capacitance $C_{EZ}$ is connected in parallel with the input capacitances $C_{E,T1}$, $C_{E,T2}$.

FIG. 4 shows snapshots of the current flows in the circuit detail of FIG. 2, in time sequence. Corresponding to this, the time profile of some variables of the circuit detail of FIG. 2 is illustrated in FIG. 5 with reference to the voltages illustrated in FIG. 2.

Figure 4A:
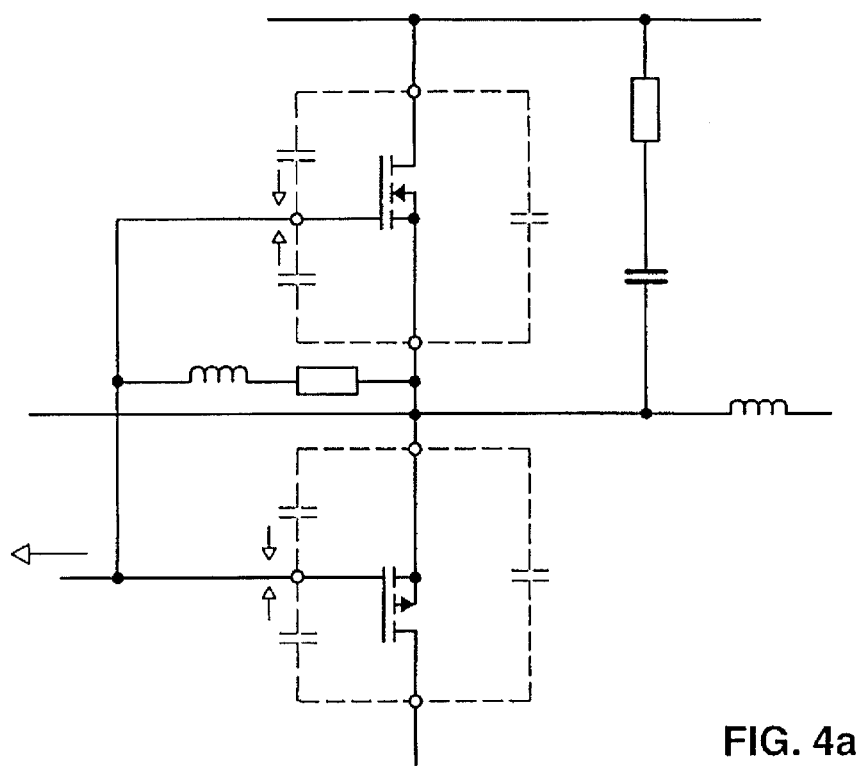
FIGS. 4a to 4g show a time sequence of the current flows as they occur in the detail in accordance with FIG. 2.
Figure 4B:
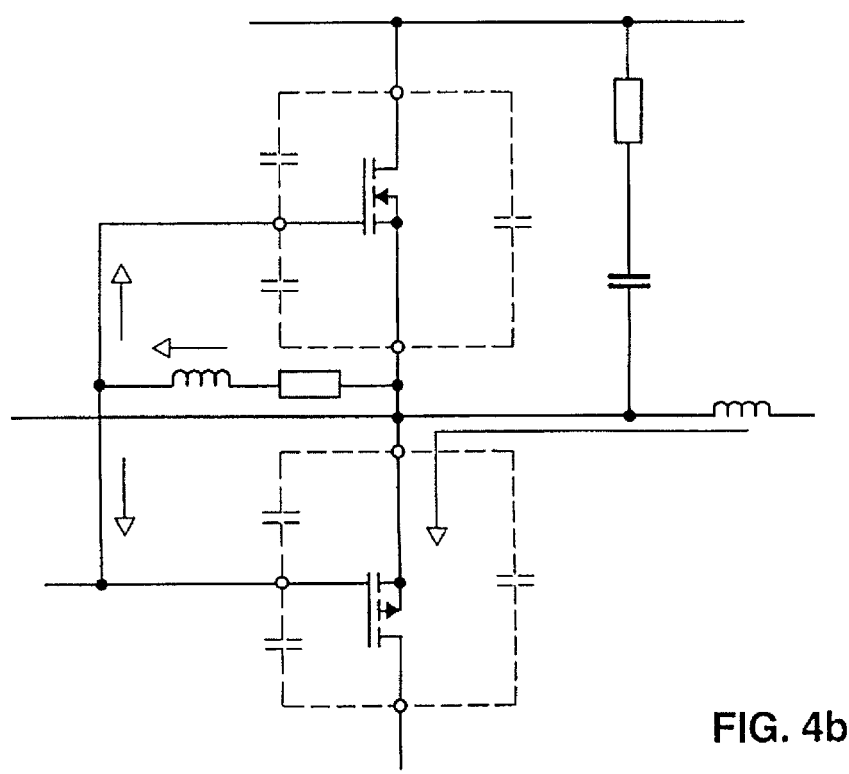
Figure 4C:
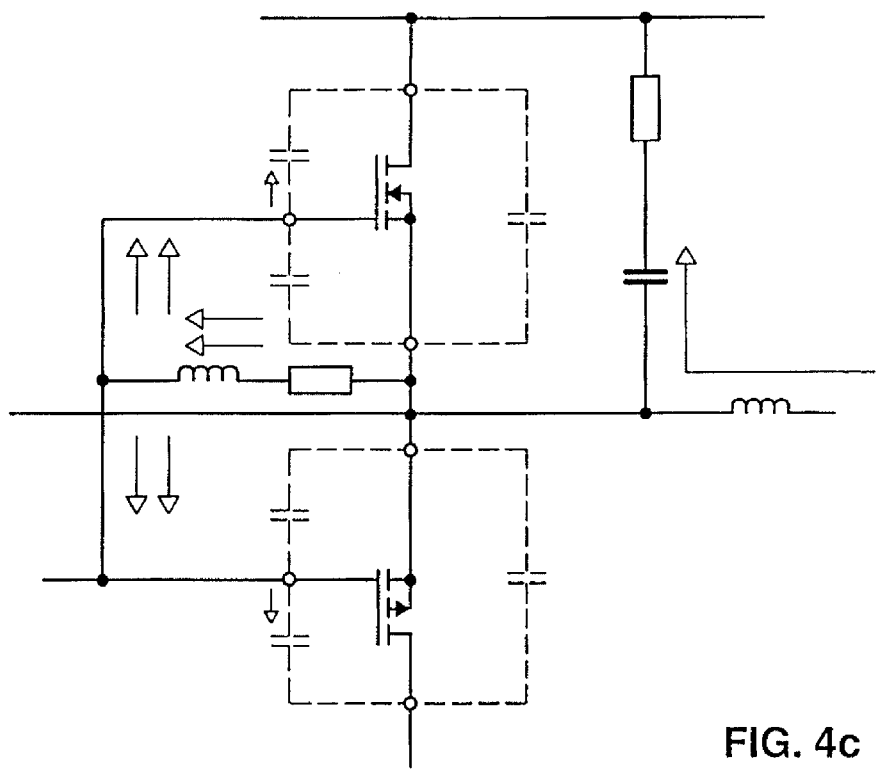
Figure 4D:
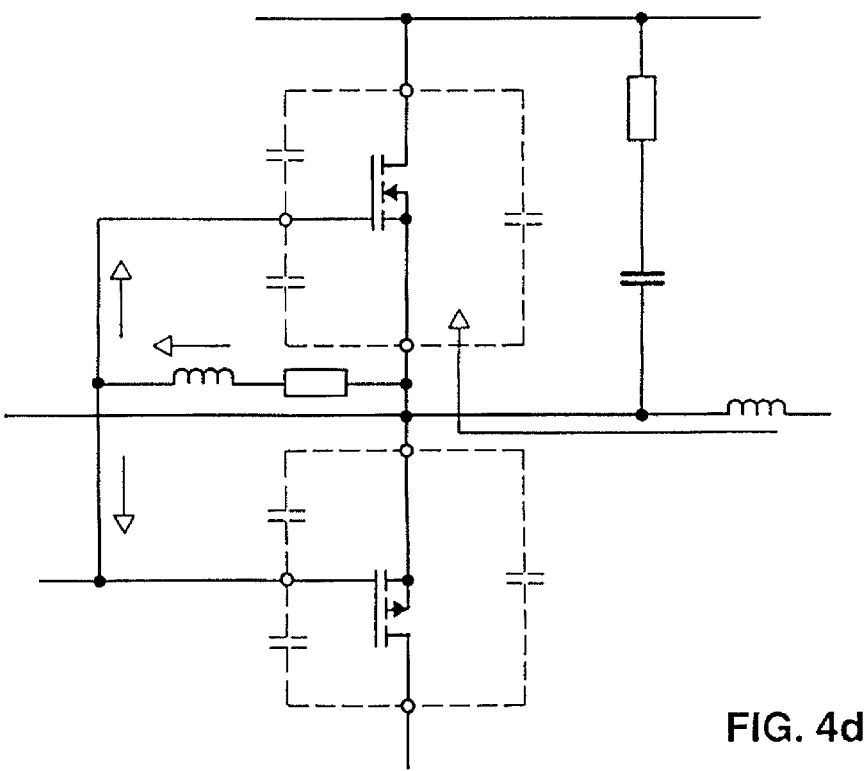
Figure 4E:
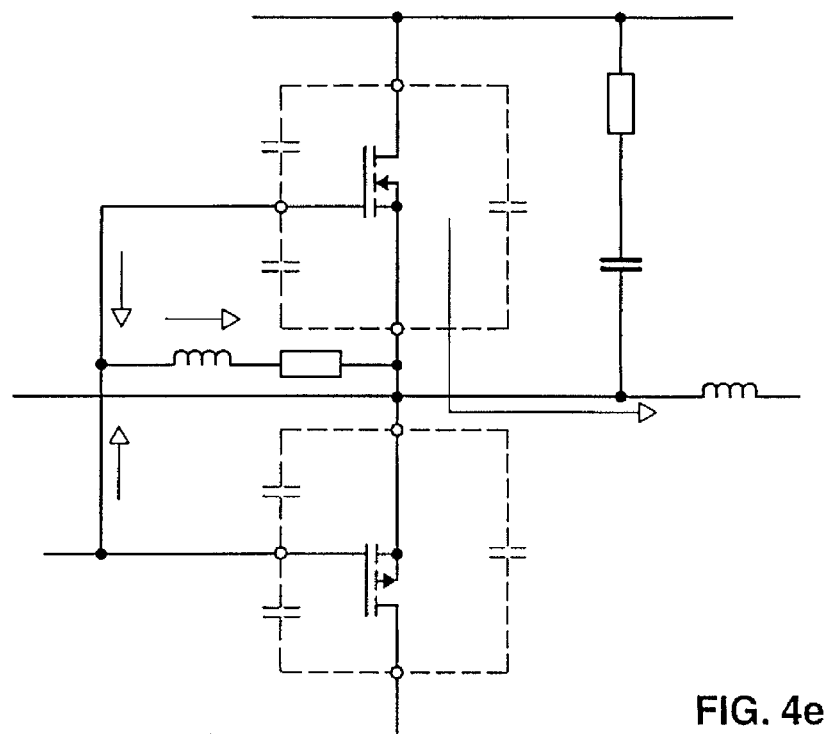
Figure 4F:
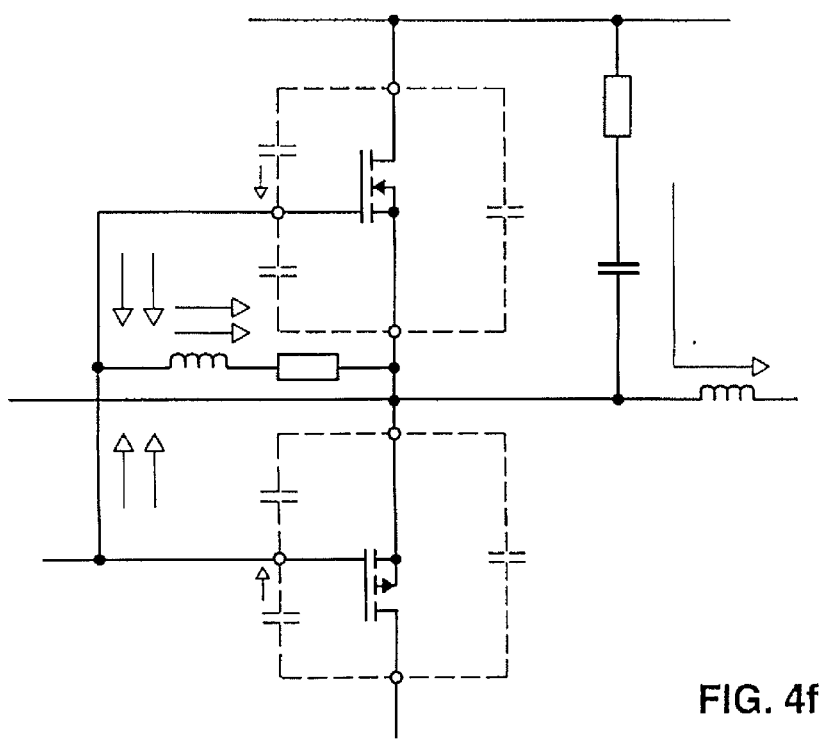
Figure 4G:
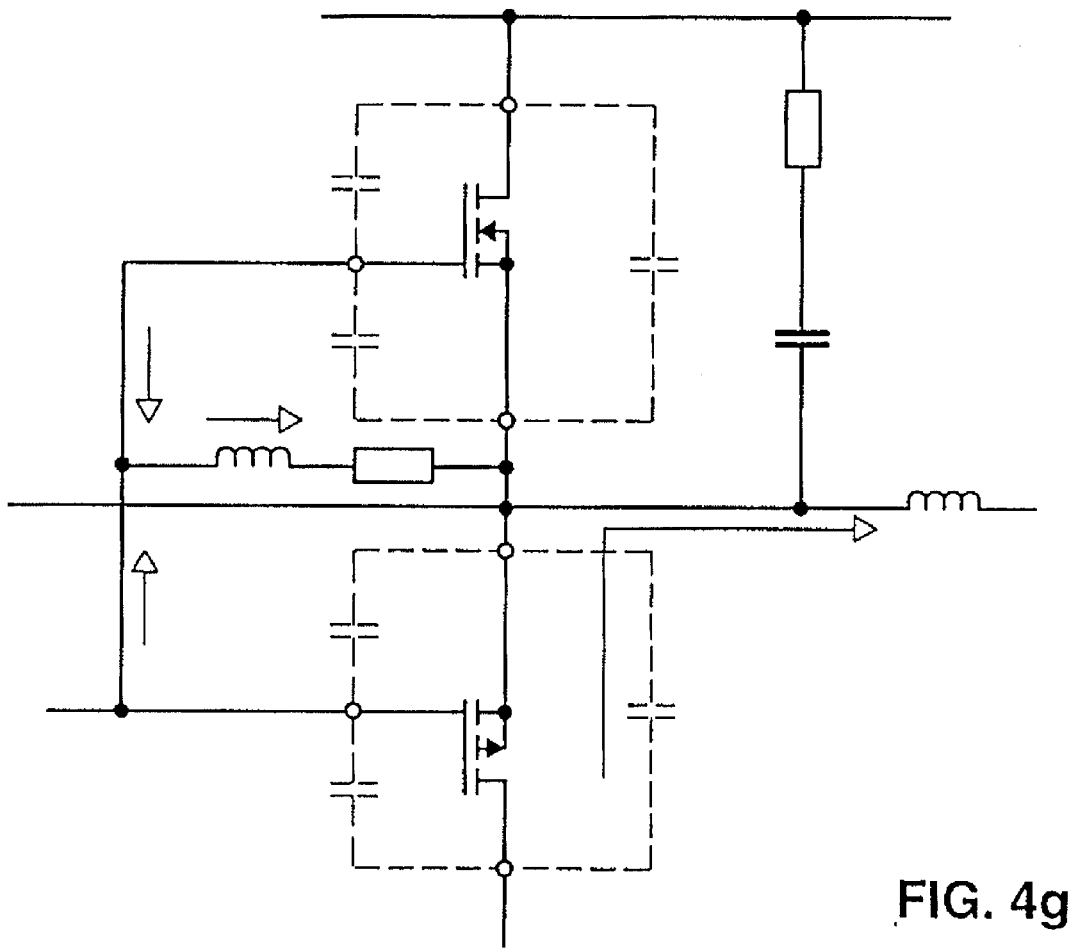

Before considering the normal operation, that is to say the maintenance of an oscillation of the free-running circuit arrangement, the first aim is to explain the processes that unfold until a self-maintaining oscillation is produced. The starting point is a DC voltage present across the capacitor C2 as a result of which the capacitor C3 is charged via the resistors R1, R2. Because of the voltage rise across C3, the voltage present at the diac also rises. If the latter voltage exceeds the trigger threshold of the diac, the latter turns on and, as a result, a negative voltage pulse reaches the two gate terminals of the complementary transistors T1 and T2. This charges the capacitances $C_{M,T1}$, $C_{E,T1}$, $C_{E,T2}$, while the capacitance $C_{M,T2}$ is discharged. The current flow illustrated in FIG. 4a is set up.

Figure 5:
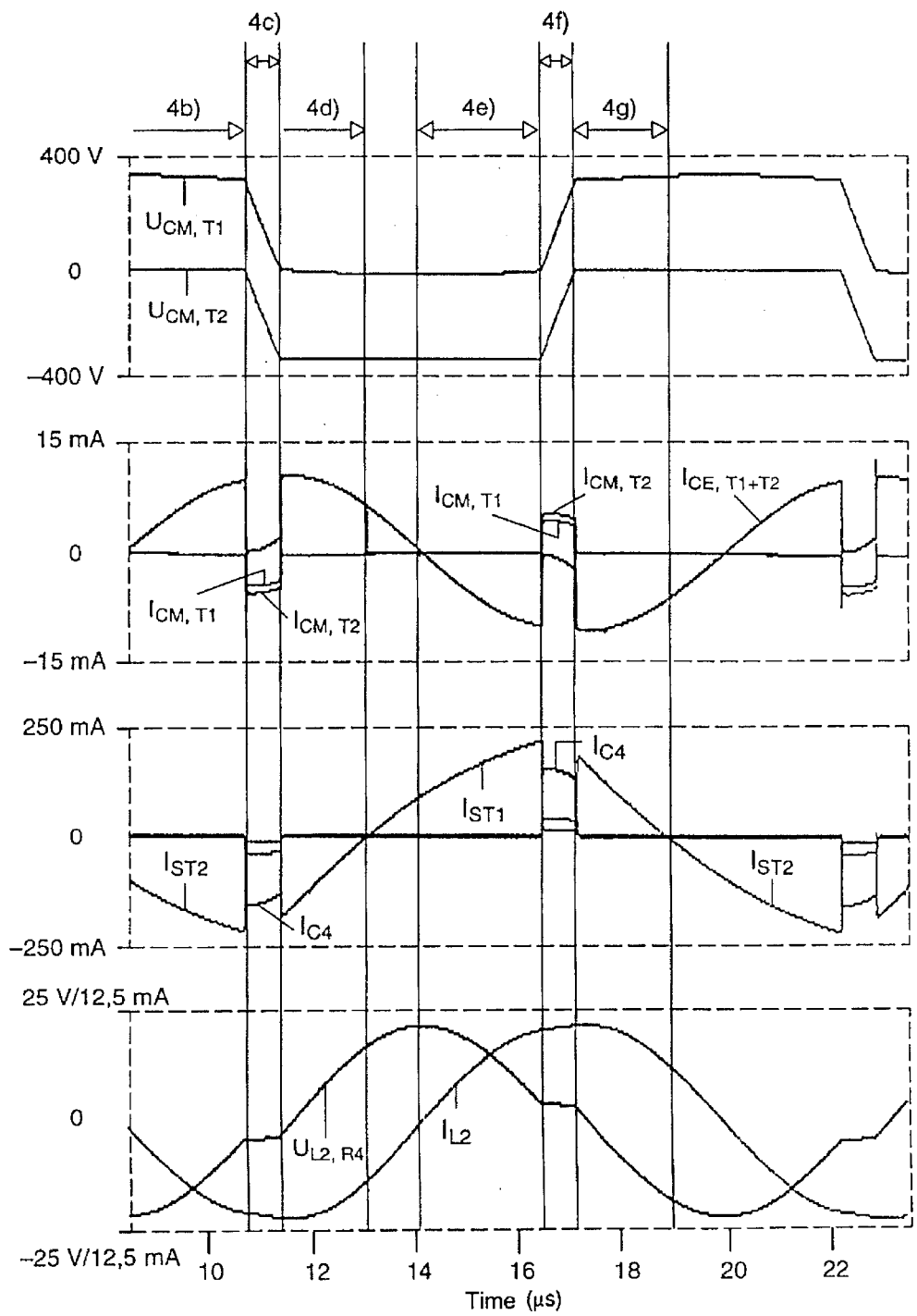
FIG. 5 shows the time profile of some variables of the detail in FIG. 2.

Because of the negative voltage pulse at the gate electrodes of the two transistors, which is effected by the ignition of the diac, the transistor T2 is opened, see the current flow $I_{ST2}$ in period 4b in FIG. 5. Consequently, a current begins to flow in the load circuit via the capacitor C5, the capacitor C6 and the inductor L3. The current $I_{ST2}$, increasing in absolute terms, flows against the voltage direction $U_{CA,T2}$ defined in FIG. 2, and therefore has a negative sign. The negative voltage pulse at the gate electrode simultaneously causes the rise of a control current $I_{L2}$ through the inductor L2, which for the most part once again reverses the charge of the two input capacitances $C_{E,T1}$, $C_{E,T2}$ of the transistors T1, T2. The current $I_{L2}$ opposes the voltage supplied by the diac such that the previously negative gate voltage is reduced.

With reference to FIG. 5, the start of the period 4c is typified in that after the threshold voltage of the transistor T2 is undershot the latter blows, and the load current injected in the inductor L3 now flows via the resistor R5 and discharges the capacitor C4. At the same time as the change in the voltage across the capacitor C4, there is also a change in the voltage across the Miller capacitances $C_{M,T1}$, $C_{M,T2}$ of the two transistors T1, T2. In particular, as a result of this the tie point of the two source electrodes is positioned virtually at the voltage $U_Z$, the Miller capacitances $C_{M,T1}$, $C_{M,T2}$ participating fully in this voltage excursion. The change in voltage at the Miller capacitances $C_{M,T1}$, $C_{M,T2}$ effects a current flow in accordance with $$I_c = C \cdot \frac{dU_c(t)}{dt}.$$

These charging and discharging currents $I_{CM,T1}$, $I_{CM,T2}$ effect an additional current flow through the inductor L2. In this phase, energy is fed to the control circuit via the Miller capacitances $C_{M,T1}$, $C_{M,T2}$.

The start of the period 4d is typified in that following the drop in the drain-source voltage across the transistor T1 the inner freewheeling diode thereof turns on, and thus takes over the main part of the current of the inductor L3. As soon as the majority of the load current is flowing via the freewheeling diode of the transistor T1, see $I_{ST1}$ in FIG. 5, the charge-reversal processes of the Miller capacitances $C_{M,T1}$, $C_{M,T2}$ are largely concluded. The current injected in the inductor L2 now chiefly reverses the charge of the two input capacitances $C_{E,T1}$, $C_{E,T2}$ of the two transistors T1, T2, and first effects a further drop in the gate voltage to zero and finally a rise to positive voltage values. After the threshold voltage of the transistor T1 is exceeded, the latter is turned on. The current injected in the inductor L2 decays to zero during the on phase of T1, the start of period 4e being defined thereby. The input capacitances $C_{E,T1}$ and $C_{E,T2}$ of the two transistors T1, T2 are charged appropriately such that the current can now flow from the charged capacitances to the gate circuit L2, R4 (just as in the load circuit, in the control circuit the result is also a current reversal). The control current $I_{L2}$ through the inductor L2, which is now flowing in the reverse direction, counteracts the still positive gate voltage. The gate voltage, which therefore decreases, finally undershoots the threshold voltage of the transistor T1, such that the latter turns off. This is the start of period 4f of FIG. 5. The current injected in the inductor L3 now flows again via the resistor R5 and charges the capacitor C4. At the same time as the change in the voltage across the capacitor C4, there is also a change in the voltage across the Miller capacitances $C_{M,T1}$, $C_{M,T2}$ of the two transistors T1, T2. The charging and discharging currents $I_{CM,T1}$, $I_{CM,T2}$ thereby constrained again effect an additional current flow through the inductor L2, see the lowermost diagram in FIG. 5. In this phase, energy is fed to the control circuit once more via the Miller capacitances $C_{M,T1}$, $C_{M,T2}$. After a rise in the voltage via the Miller capacitance $C_{M,T2}$ of the transistor T2, the internal freewheeling diode of the transistor T2 turns on and takes over the main part of the current of the inductor L3, see the start of period 4g. As soon as the majority of the load current is flowing via the freewheeling diode of the transistor T2, the Miller charge-reversal processes are largely concluded. The current IL2 injected in the inductor L2 chiefly reverses the charges of the two input capacitances $C_{E,T1}$, $C_{E,T2}$ of the transistors T1, T2, and initially effects a further drop in the gate voltage to zero and, finally, a rise to negative voltage values.

The switching processes of periods 4b to 4g in FIGS. 4 and 5 proceed further sequentially such that a current flow oscillating to and fro is produced in the control circuit and in the load circuit. The frequency of this initial oscillation is somewhat higher than the resonant frequency of the load circuit. Finally, owing to resonance step-up the voltage across the illuminating means La rises so strongly that the latter ignites. The majority of the load current is now flowing via the illuminating means La. After ignition, the illuminating means itself acts virtually like a purely ohmic consumer, and damps the resonant circuit in such a way that the voltage required for the stable operation is finally set up across the illuminating means La.

The innovation of the present invention consists in principle in feeding so much energy to the control resonant circuit in periods 4c and 4f owing to charging and discharging processes of the Miller capacitances $C_{M,T1}$, $C_{M,T2}$ of the two switching elements T1, T2 that an oscillation is maintained.

What is claimed is:

1. A free-running circuit arrangement for operating a load (La), having at least one switching element (T1, T2), a freewheeling diode that is connected in an anti-parallel fashion relative to the main current direction of the at least one switching element (T1, T2), a load circuit (L3, C6, C5) and a control resonant circuit (L2, $C_{E,T1}$, $C_{E,T2}$) which comprises at least one control inductor (L2) and at least one self-capacitance ($C_{E,T1}$, $C_{E,T2}$) of the at least one switching element (T1, T2), characterized in that the at least one switching element (T1, T2) has a control electrode, a working electrode and a reference electrode, there acting between the control electrode and the working electrode a capacitance ($C_{M,T1}$, $C_{M,T2}$) that is coupled to the control resonant circuit (L2, $C_{E,T1}$, $C_{E,T2}$) in such a way that energy is fed into the control resonant circuit (L2, $C_{E,T1}$, $C_{E,T2}$) by the charging and discharging current ($I_{CM,T1}$, $I_{CM,T2}$) of this capacitance ($C_{M,T1}$, $C_{M,T2}$), the circuit arrangement having no components for feeding energy into the control resonant circuit by electromagnetic coupling.

2. The circuit arrangement as claimed in claim 1, characterized in that the at least one switching element (T1, T2) has a Miller capacitance ($C_{M,T1}$, $C_{M,T2}$), and the capacitance acting between the control electrode and the working electrode of the switching element (T1, T2) comprises the Miller capacitance ($C_{M,T1}$, $C_{M,T2}$) of the at least one switching element (T1, T2).

3. The circuit arrangement as claimed in claim 2, characterized in that the control resonant circuit (L2, $C_{E,T1}$, $C_{E,T2}$) and the Miller capacitance ($C_{M,T1}$, $C_{M,T2}$) of the at least one switching element (T1, T2) are tuned to one another in such a way that the oscillation of the control resonant circuit (L2, $C_{E,T1}$, $C_{E,T2}$) is maintained solely by the charging and discharging currents ($I_{CM,T1}$, $I_{CM,T2}$) of the Miller capacitance ($C_{M,T1}$, $C_{M,T2}$) of the at least one switching element (T1, T2).

4. The circuit arrangement as claimed in claim 2, characterized in that an additional capacitance ($C_{MZ}$) is connected in parallel with the Miller capacitance ($C_{M,T1}$, $C_{M,T2}$) of the at least one switching element (T1, T2), the oscillation of the control resonant circuit (L2, $C_{E,T1}$, $C_{E,T2}$) being maintained by the charging and discharging currents ($I_{CM,T1}$, $I_{CM,T2}$) of the Miller capacitance and of the additional capacitance ($C_{MZ}$) of the at least one switching element.

5. The circuit arrangement as claimed in claim 1, characterized in that the self-capacitance of the at least one switching element is a self-capacitance ($C_{E,T1}$, $C_{E,T2}$) of the latter present between control and reference electrodes.

6. The circuit arrangement as claimed in claim 1, characterized in that it has a first and a second switching element (T1, T2), the first and the second switching elements (T1, T2) being of complementary design and being coupled to a common control resonant circuit (L2, $C_{E,T1}$, $C_{E,T2}$).

7. The circuit arrangement as claimed in claim 6, characterized in that each switching element (T1, T2) has a control electrode, a working electrode and a reference electrode, the control electrodes being connected to one another with the formation of a first tie point, and the reference electrodes being connected to one another with the formation of a second tie point, the control inductor (L2) being coupled between the first and the second tie point.

8. The circuit arrangement as claimed in claim 1, characterized in that it has a first and a second switching element (T1, T2) that are of the same type, the first switching element (T1) being coupled to a first control resonant circuit, and the second switching element (T2) being coupled to a second control resonant circuit.

9. The circuit arrangement as claimed in claim 8, characterized in that each switching element (T1, T2) has a control electrode, a working electrode and a reference electrode, the reference electrode of the first switching element (T1) being connected to the working electrode of the second switching element (T2), and the respective control inductor being coupled between the respective control and reference electrodes of the respective switching element.

10. The circuit arrangement as claimed in claim 6, characterized in that the first and the second switching element (T1, T2) are arranged in a half-bridge arrangement.

11. The circuit arrangement as claimed in claim 1, characterized in that the load is an illuminating means (La), preferably a low-pressure discharge lamp.

12. The circuit arrangement as claimed in claim 5, characterized in that a supplementary capacitance ($C_{EZ}$) is connected in parallel with a input capacitance ($C_{E,T1}$, $C_{E,T2}$) of the at least one switching element (T1, T2).

13. The circuit arrangement as claimed in claim 1, characterized in that the load circuit comprises a series tuned circuit with an inductor (L3), a capacitance (C6) connected in parallel with the load and at least one decoupling capacitance (C5).

14. The circuit arrangement as claimed in claim 1, characterized in that the at least one switching element (T1, T2) is an MOS field effect transistor, and the freewheeling diode connected in an anti-parallel fashion to the at least one switching element (T1, T2) is the body diode of the latter.

15. The circuit arrangement as claimed in claim 7, characterized in that the first and the second switching element (T1, T2) are arranged in a half-bridge arrangement.

16. The circuit arrangement as claimed in claim 8, characterized in that the first and the second switching element (T1, T2) are arranged in a half-bridge arrangement.

17. The circuit arrangement as claimed in claim 9, characterized in that the first and the second switching element (T1, T2) are arranged in a half-bridge arrangement.

* * * * *